(12) United States Patent
Matsushita et al.

(10) Patent No.: US 8,265,829 B2
(45) Date of Patent: Sep. 11, 2012

(54) STEERING CONTROL SYSTEM

(75) Inventors: Masaki Matsushita, Tokyo (JP); Takayuki Kifuku, Tokyo (JP); Hiroyuki Kozuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1011 days.

(21) Appl. No.: 12/118,821

(22) Filed: May 12, 2008

(65) Prior Publication Data

US 2009/0143942 A1    Jun. 4, 2009

(30) Foreign Application Priority Data

Nov. 30, 2007    (JP) .................................. 2007-310236

(51) Int. Cl.
*B62D 5/04* (2006.01)

(52) U.S. Cl. .............................. 701/42; 701/43; 180/446

(58) Field of Classification Search ................... 701/41, 701/42, 43, 44; 180/443, 446
See application file for complete search history.

(56) References Cited

U.S. PATENT DOCUMENTS

| | | | |
|---|---|---|---|
| 5,436,837 A | 7/1995 | Gerstung et al. | |
| 5,504,679 A | 4/1996 | Wada et al. | |
| 5,912,539 A * | 6/1999 | Sugitani et al. | 318/434 |
| 6,373,217 B1 | 4/2002 | Kawada et al. | |
| 6,497,303 B1 | 12/2002 | Nishimura et al. | |
| 7,165,646 B2 | 1/2007 | Kifuku et al. | |
| 7,176,646 B2 * | 2/2007 | Iwazawa | 318/432 |
| 7,203,583 B2 * | 4/2007 | Fujimoto et al. | 701/41 |
| 2006/0076182 A1 | 4/2006 | Kifuku et al. | |

FOREIGN PATENT DOCUMENTS

| | | |
|---|---|---|
| DE | 4404648 A1 | 8/1994 |
| DE | 102005023066 A1 | 4/2006 |
| JP | 3-286340 A | 12/1991 |
| JP | 5-147477 A | 6/1993 |
| JP | 6-239261 A | 8/1994 |
| JP | 2915234 B2 | 4/1999 |
| JP | 2922383 B2 | 4/1999 |
| JP | 2983402 B2 | 9/1999 |
| JP | 2001-18819 A | 1/2001 |
| JP | 2001-347963 A | 12/2001 |
| JP | 2002-12157 A | 1/2002 |
| JP | 2003-28823 A | 1/2003 |
| JP | 2005-119341 A | 5/2005 |
| JP | 2006-76478 A | 3/2006 |

(Continued)

OTHER PUBLICATIONS

Korean Notification of Submission of Opinion issued in counterpart Korean Application No. 10-2008-0044888 dated Oct. 30, 2009.

(Continued)

*Primary Examiner* — Kevin Hurley
(74) *Attorney, Agent, or Firm* — Sughrue Mion, PLLC

(57) ABSTRACT

A steering control system is connectable to a motor configured to control a steering and a LAN (Local Area Network) and is allowed to receive a control signal for controlling said motor from the LAN is received. The steering control system includes: a motor configured to control a steering; a main calculation unit connectable to the LAN; a motor drive circuit connected to the main calculation unit and configured to drive the motor; a sub calculation unit connectable to the LAN; and a motor drive limiting unit connected to the sub calculation unit and configured to limit a drive of the motor.

15 Claims, 7 Drawing Sheets

FOREIGN PATENT DOCUMENTS

| | | |
|---|---|---|
| JP | 2006-131102 A | 5/2006 |
| JP | 2006-202167 A | 8/2006 |
| JP | 2006-222649 A | 8/2006 |
| JP | 2006-327547 A | 12/2006 |
| JP | 2006-335157 A | 12/2006 |
| JP | 2007-245821 A | 9/2007 |
| JP | 2007-245891 A | 9/2007 |

OTHER PUBLICATIONS

Notification of Reasons for Refusal issued in counterpart Japanese Application No. 2007-310236 dated Dec. 8, 2009.

German Office Action issued in Application No. 102008025382.0 dated Feb. 8, 2012.

* cited by examiner

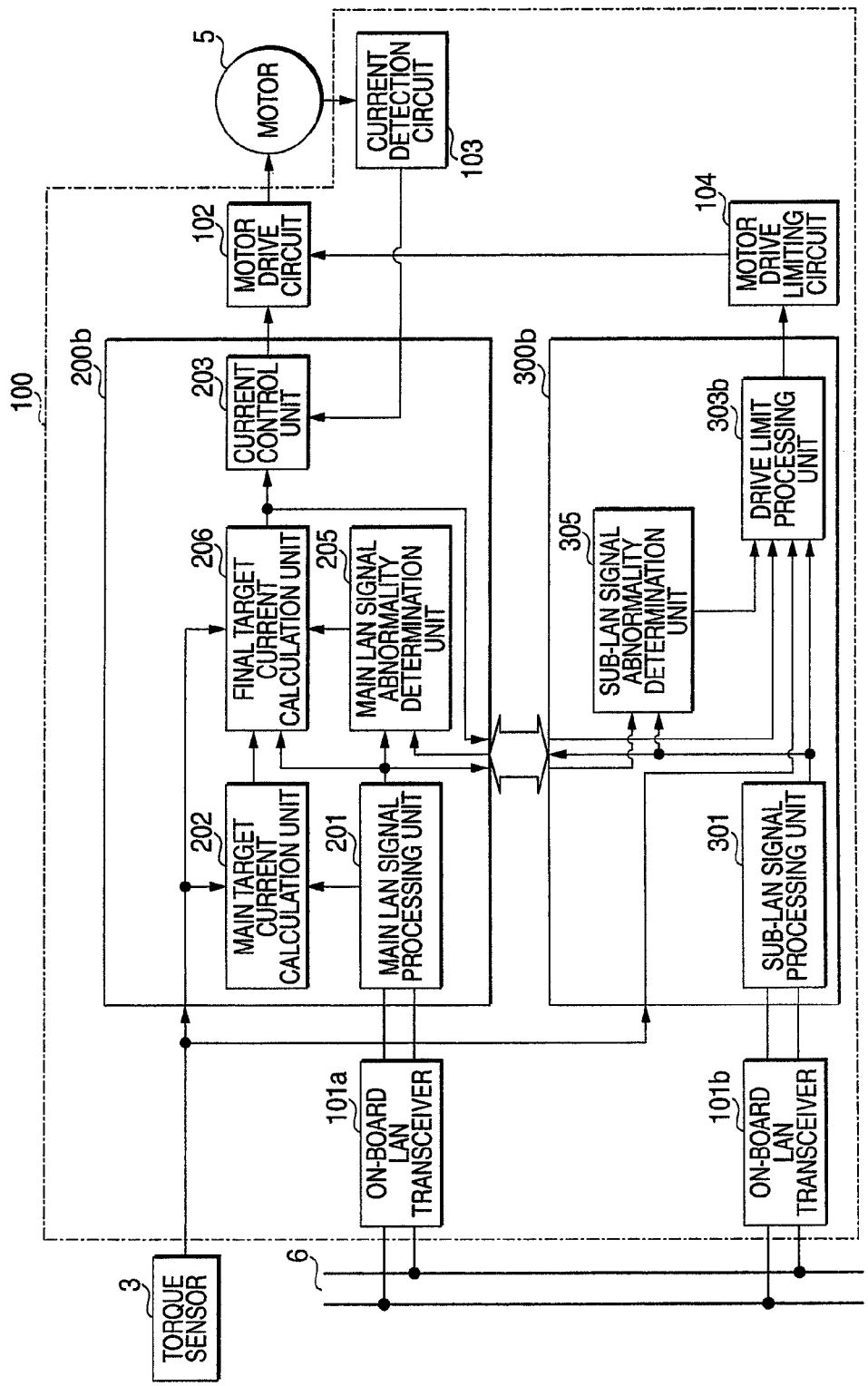

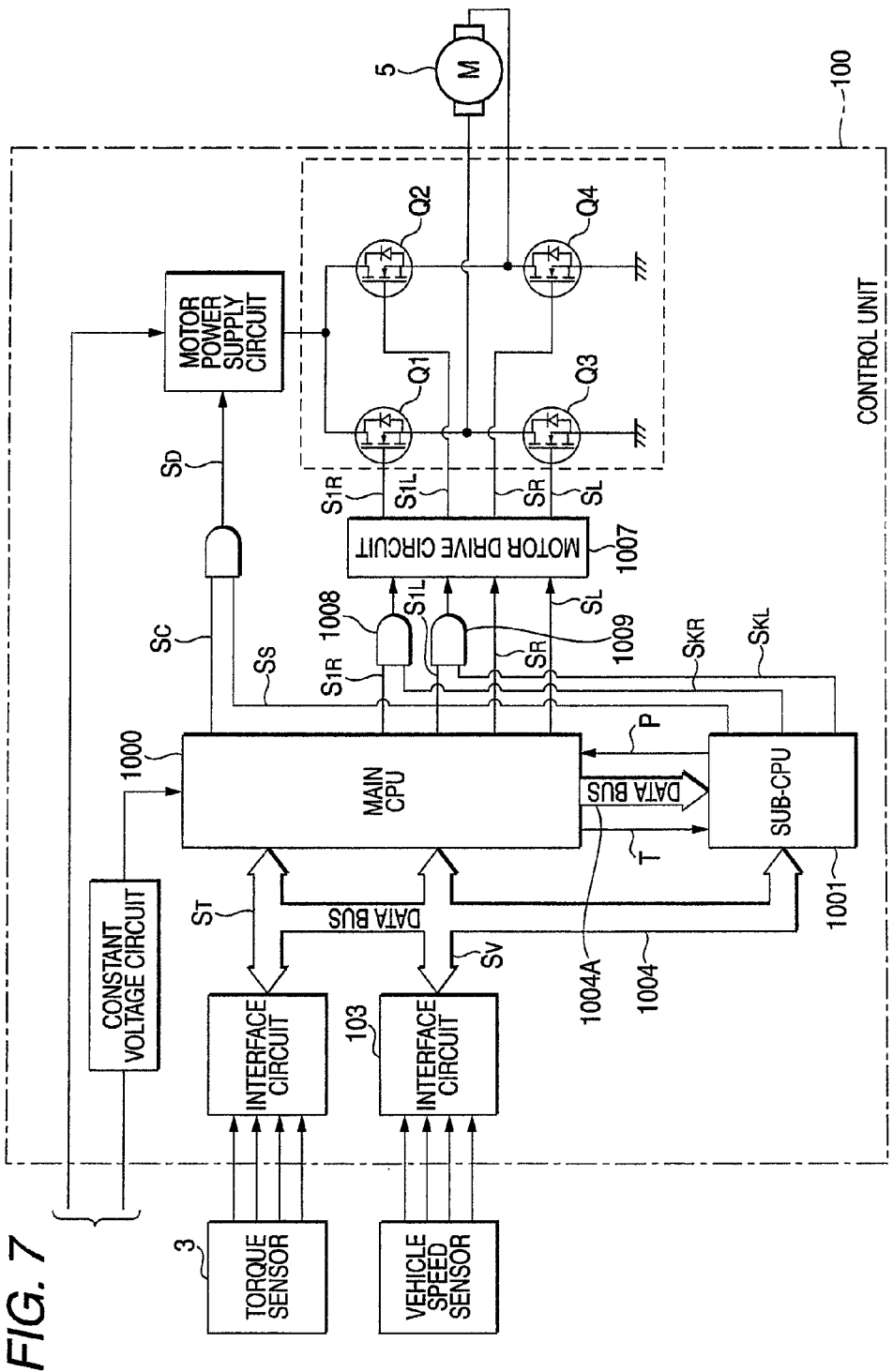
FIG. 7  -- PRIOR ART --

# STEERING CONTROL SYSTEM

CROSS-REFERENCE TO RELATED APPLICATIONS

This application is based upon and claims the benefit of priority from Japanese Patent Application No. 2007-310236, filed on Nov. 30, 2007, the entire contents of which are incorporated herein by reference.

BACKGROUND OF THE INVENTION

1. Field

The present invention relates to a steering control system for use in the automobile or the like.

2. Description of the Related Art

FIG. 7 is a diagram showing a steering control system having two CPUs, which is disclosed in JP-B-2915234. A sub-CPU 1001 is connected to a main CPU 1000 via a data bus 1004A. Also, the sub-CPU 1001 drives a logical circuit 1008, 1009 with an output signal SKR, SKL, and enables a motor drive circuit 1007 to limit the drive direction of a motor 5 with a drive direction signal SIR, SIL of the main CPU 1000. The control unit 100 includes an H-bridge circuit configured by field effect transistors (FET) Q1 to Q4 for supplying power to the motor 5.

The operation will be described below. The main CPU 1000 computes the drive direction of the motor 5, based on a detection result of a torque sensor 3, and sends the drive direction of the motor 5 that is the computation result to the sub-CPU 1001 via the data bus 1004A. The sub-CPU 1001 compares a steering wheel torque signal ST from the torque sensor 3 with the drive direction from the main CPU 1000, and if both are unmatched, determines a failure and outputs the output signal SKR, SKL to inhibit the driving of the motor 5.

The above steering control system is configured in the above manner, and is difficult to apply as the steering control system that inputs drive information of the vehicle such as vehicle speed via an on-board LAN from the outside. Also, it is difficult to make the motor drive control in which the drive direction and the steering wheel torque are unmatched such as the motor drive control in response to a signal sent via the on-board LAN from the external on-board control system.

SUMMARY OF THE INVENTION

This invention has been conceived in the light of the above-mentioned circumstances, and it is an object of an aspect of the invention to provide a redundant control system for making the complicate control with a simple configuration.

According to one aspect of the invention, there is provided a steering control system that is connectable to a motor configured to control a steering and a LAN (Local Area Network) and is allowed to receive a control signal for controlling the motor from the LAN is received, said steering control system comprising: a motor configured to control a steering; a main calculation unit connectable to the LAN; a motor drive circuit connected to the main calculation unit and configured to drive the motor; a sub calculation unit connectable to the LAN; and a motor drive limiting unit connected to the sub calculation unit and configured to limit a drive of the motor.

According to an aspect of the invention, it is possible to realize a redundant steering control system with a simple configuration for inputting drive information of the vehicle such as the vehicle speed or a motor drive instruction via an on-board LAN from the outside.

BRIEF DESCRIPTION OF THE DRAWINGS

FIG. 5 is a functional block diagram showing functionally the steering control system according to an embodiment 3 of the invention;

FIG. 7 is a diagram showing a conventional steering control system having two CPUs.

DETAILED DESCRIPTION OF THE PREFERRED EMBODIMENT

Embodiment 1

Figure 1:
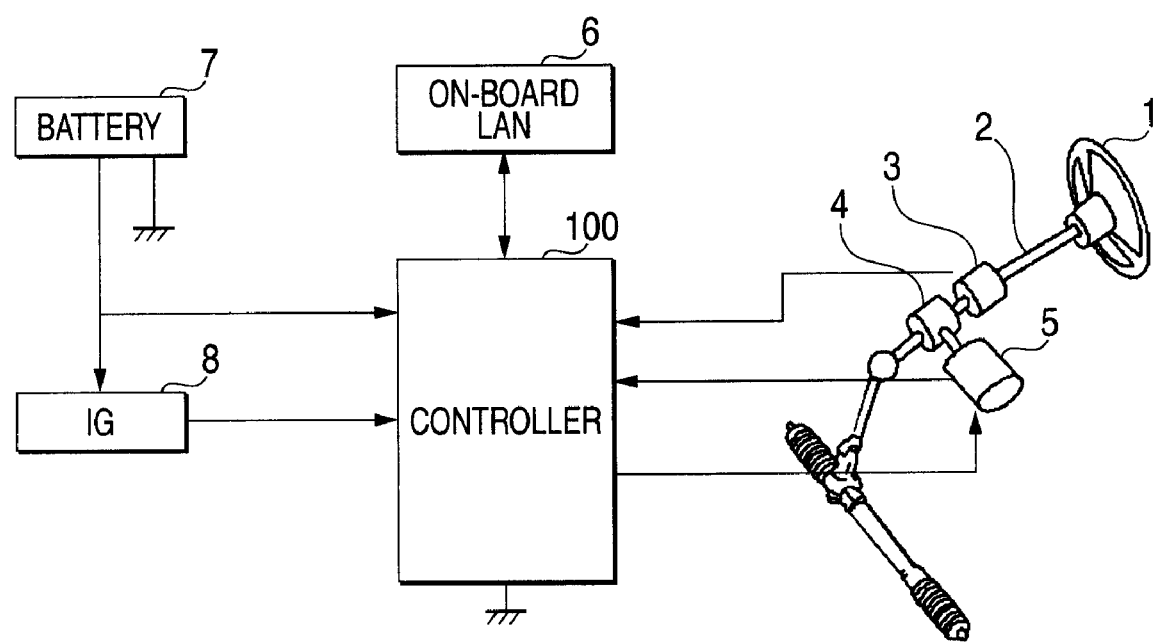
FIG. 1 is a structure diagram of a steering control system according to an embodiment 1 of the present invention.

An embodiment 1 of the present invention will be described below with reference to the drawings. FIG. 1 is a structure diagram of a steering control system according to the embodiment 1 of the invention.

A motor 5 configured to generate a steering wheel assist torque is connected via a reduction gear 4 to one end of a steering shaft 2, and a steering wheel 1 is connected to the other end of the steering shaft 2. Also, a torque sensor 3 for detecting a steering wheel torque applied to the steering wheel 1 is connected to the steering shaft 2. A battery 7 supplies power to the controller 100 and an ignition (IG) part 8.

A controller 100 decides a steering wheel assist torque, based on a torque detection value detected by the torque sensor 3 and a control signal from an on-board LAN 6, and assists the steering of the steering wheel 1 by driving the motor 5.

Figure 2:
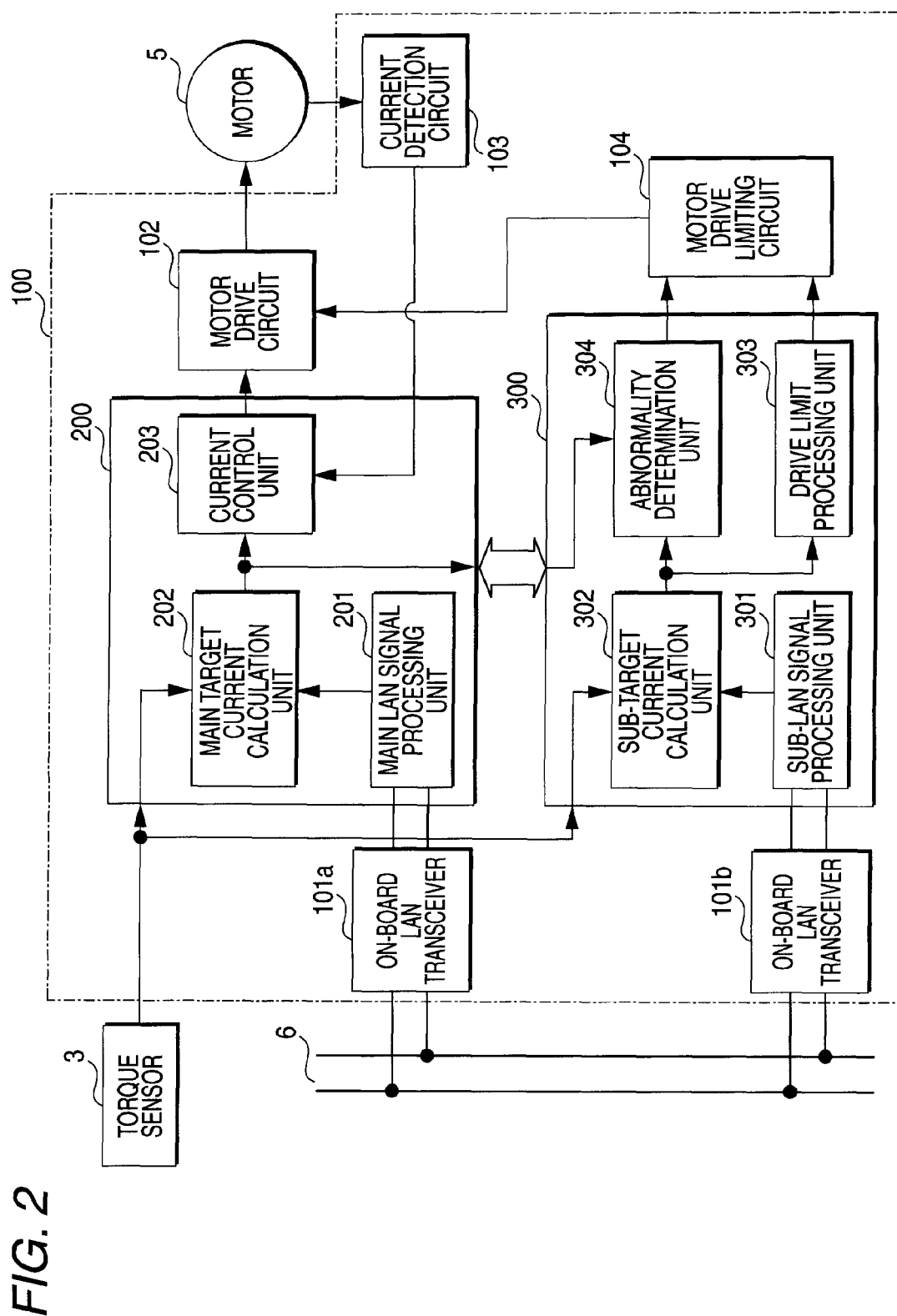
FIG. 2 is a functional block diagram showing functionally the steering control system according to the embodiment 1 of the invention.

FIG. 2 is a functional block diagram showing functionally the steering control system according to the embodiment 1.

The steering control system according to the embodiment 1 includes the on-board LAN signal transceivers 101a and 101b, a motor drive circuit 102 for driving a motor 5, a current detection circuit 103 for detecting a current flowing through the motor 5, a motor drive limiting circuit (motor drive limiting unit) 104 for limiting the driving of the motor 5, a microcontroller 200 that serves as a main calculation unit, and a microcontroller 300 that serves as a sub calculation unit.

In FIG. 2, reference numeral 200 denotes a microcomputer configured to perform the steering assist control. In the microcomputer 200, the software configuration is shown with the functional blocks. In FIG. 2, the microcomputer 200 includes a main LAN signal processing unit 201, a main target current calculation unit 202, and a current control unit 203.

The main LAN signal processing unit 201 supplies a control signal (e.g., vehicle speed signal vsp1) obtained via the on-board LAN 6 to the main target current calculation unit 202.

The main target current calculation unit 202 decides a main target current value (Ti1) for driving the motor 5 by making a predetermined arithmetical calculation, based on a torque detection signal Ts1 of the torque sensor 3 for detecting the steering wheel torque and a control signal (e.g., vehicle speed signal vsp1) from the on-board LAN 6, and supplies the decided Ti1 to the current control unit 203.

Also, the main target current value (Ti1) is supplied to an abnormality determination unit 304 in the microcomputer 300 through communication.

The current control unit 203 performs the feedback control for matching a detection current (Mi) detected by the current detection circuit 103 with the target current (Ti1) to supply a motor drive signal to the motor drive circuit 102.

In FIG. 2, reference numeral 300 denotes a microcomputer configured to limit the driving of the motor. In the microcomputer 300, the software configuration is shown with the functional blocks. In FIG. 2, the microcomputer 300 comprises a sub-LAN signal processing unit 301, a sub-target current calculation unit 302, a drive limit processing unit 303 and an abnormality determination unit 304.

The sub-LAN signal processing unit 301 supplies a control signal (e.g., vehicle speed signal vsp2) obtained via the on-board LAN 6 to the sub-target current calculation unit 302.

The sub-target current calculation unit 302 decides a sub-target current value (Ti2) by making a predetermined arithmetical calculation, based on a torque detection signal Ts2 of the torque sensor 3 for detecting the steering torque and a control signal (e.g., vehicle speed signal vsp2) from the on-board LAN 6, and supplies the decided Ti2 to the abnormality determination unit 304 and the drive limit processing unit 303.

The drive limit processing unit 303 generates a drive limit signal for inhibiting the driving of the motor 5 in an opposite direction to the sub-target current Ti2, and supplies it to the motor drive limiting circuit 104.

The abnormality determination unit 304 compares the target current Ti1 received from the main calculation unit with the target current Ti2. If the deviation between Ti1 and Ti2 is greater than or equal to a predetermined value, a motor drive cut-off signal for cutting off the driving of the motor is generated and supplied to the motor drive limiting circuit 104.

The motor drive limiting circuit 104 selectively supplies a drive limit signal supplied from the drive limit processing unit 303 or a motor drive cut-off signal supplied from the abnormality determination unit 304 to the motor drive circuit 102.

The motor drive circuit 102 drives the motor 5 to generate a steering assist torque, based on a motor drive signal from the current control unit 203 and a motor drive limit signal from the motor drive limiting circuit 104.

As described above, the steering system according to this embodiment can inhibit the driving of the motor 5 in an opposite direction to the sub-target current value (Ti2) decided by the sub-target current calculation unit 302, and prevent the assist in the opposite direction even when the main target current (Ti1) is abnormal, such as when the control signal (e.g., vehicle speed signal vsp1) inputted via the main LAN signal processing unit 201 is abnormal.

Also, if the deviation between the main target current value (Ti1) and the sub-target current value (Ti2) is greater than or equal to a predetermined value, the driving of the motor 5 is cut off, whereby it is possible to securely prevent the assist based on an abnormal control signal, when the control signal (e.g., vehicle speed signal vsp1) inputted via the main LAN signal processing unit 201 is abnormal.

Embodiment 2

Figure 3:
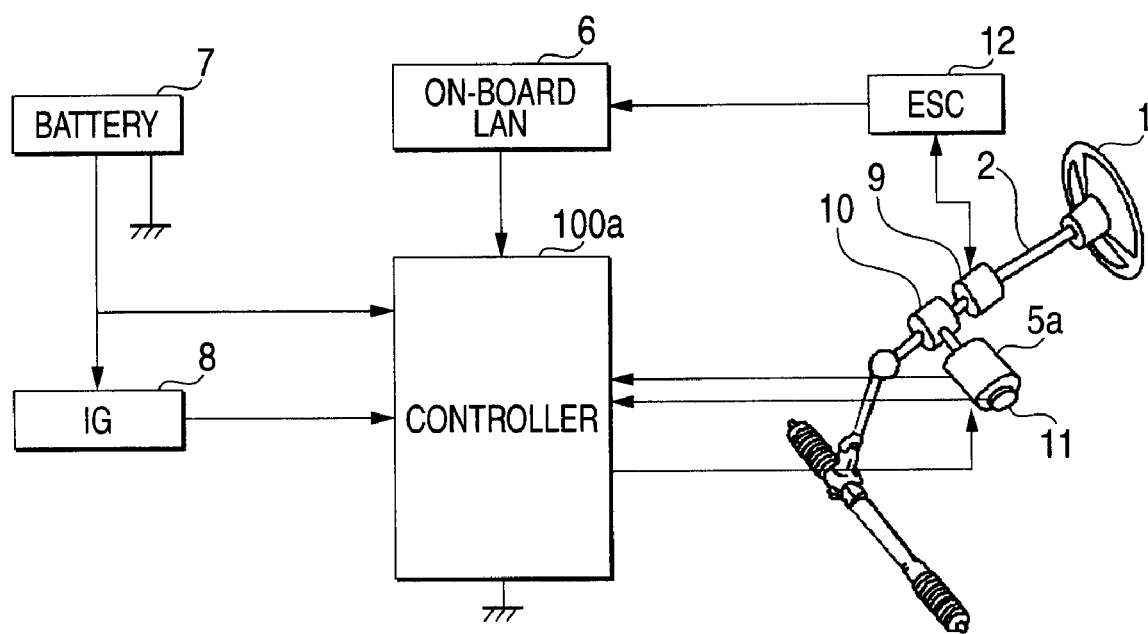
FIG. 3 is a structure diagram of a steering control system according to an embodiment 2 of the invention.

An embodiment 2 of the invention will be described below with reference to the drawings. FIG. 3 is a structure diagram of a steering control system according to the embodiment 2 of the invention.

A motor 5a is connected via a variable gear ratio actuator 10 to one end of a steering shaft 2, and the sheering wheel 1 is connected to the other end of the steering shaft 2. The variable gear ratio actuator 10 is configured to vary a steering gear ratio that is the ratio of a steering angle of a steering control wheel to a steering wheel angle applied to a steering wheel 1. Also, a steering wheel angle sensor 9 for detecting a steering wheel angle of the steering wheel 1 is connected to the steering shaft 2. Also, a motor position sensor 11 for detecting the motor position is provided.

A controller 100a decides a torque required to control the steering angle of the steering control wheel, based on a motor position detection value of the motor position sensor 11 and a control signal (e.g., a steering wheel angle detection value of the steering wheel angle sensor 9 and a vehicle speed signal) from an on-board LAN 6, and controls the variable gear ratio actuator 10 by driving the motor 5a.

Figure 4:
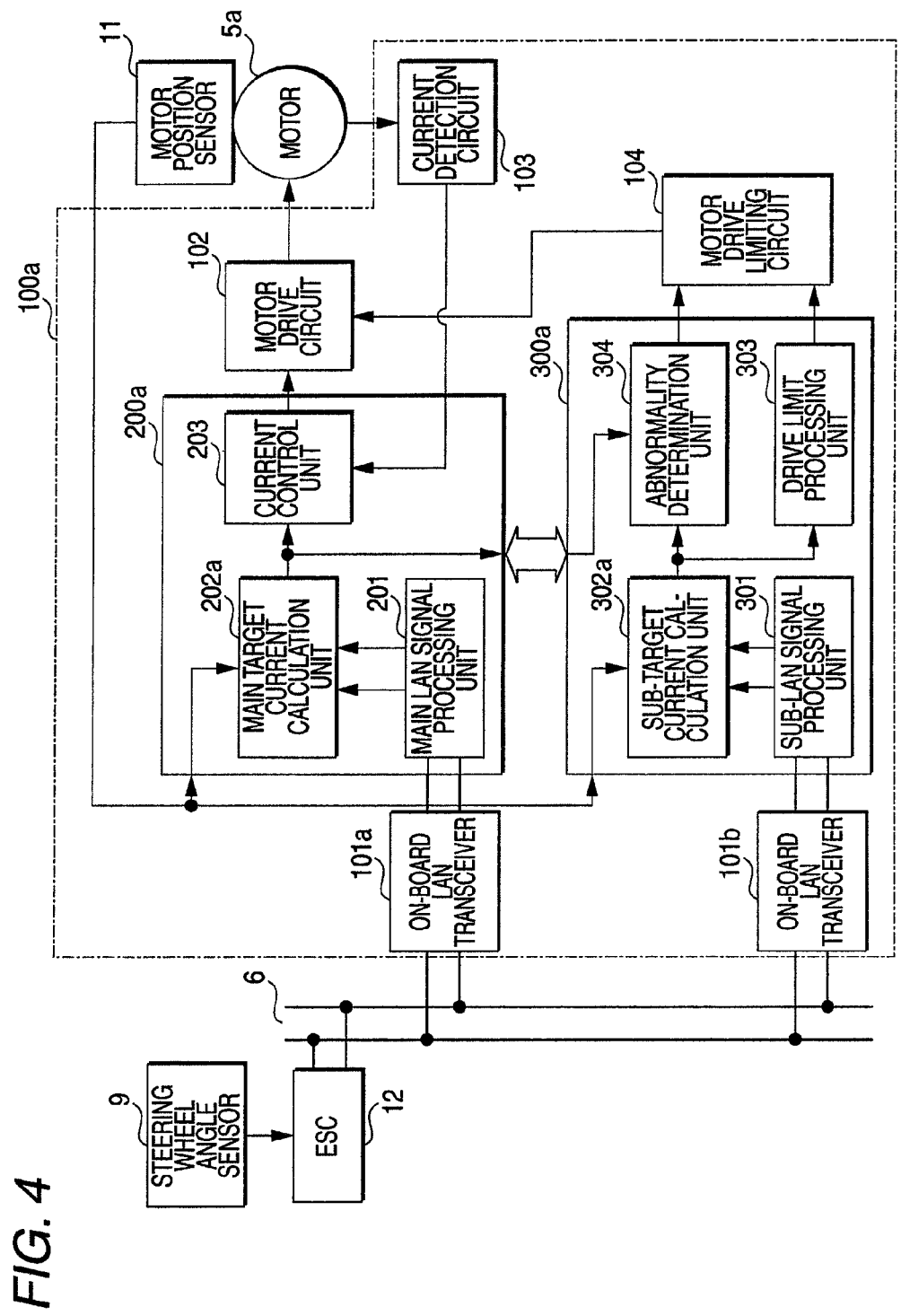
FIG. 4 is a functional block diagram showing functionally the steering control system according to the embodiment 2 of the invention.

FIG. 4 is a functional block diagram showing functionally the steering control system according to the embodiment 2.

The steering control system according to the embodiment 2 includes the on-board LAN signal transceivers 101a and 101b, a motor drive circuit 102 for driving the motor, a current detection circuit 103 for detecting a current flowing through the motor 5a, a motor drive limiting circuit (motor drive limiting unit) 104 for limiting the driving of the motor, a microcontroller 200a that serves as a main calculation unit, and a microcontroller 300a that serves as a sub calculation unit.

In FIG. 4, reference numeral 200a denotes a microcomputer configured to control the steering angle of the steering control wheel. In the microcomputer 200a, the software configuration is shown with the functional blocks. In FIG. 4, the microcomputer 200a includes a main LAN signal processing unit 201, a main target current calculation unit 202a, and a current control unit 203.

The main LAN signal processing unit 201 supplies a control signal (e.g., a steering wheel angle detection value pos1 of the steering wheel angle sensor 9 and a vehicle speed signal vsp1) obtained via the on-board LAN 6 to the main target current calculation unit 202a.

The main target current calculation unit 202a decides a main target current value (Ti1) for driving the motor 5a by making a predetermined arithmetical calculation, based on a motor position detected by the motor position sensor 11 and a control signal (e.g., a steering wheel angle pos1 detected by the sheering wheel angle sensor 9 and a vehicle speed signal vsp1) from the on-board LAN 6, and supplies the decided Ti1 to the current control unit 203.

Also, the main target current value (Ti1) is supplied to an abnormality determination unit 304 in the microcomputer 300a through communication.

The current control unit 203 performs the feedback control for matching a detection current (Mi) detected by the current detection circuit 103 with the target current (Ti1) to supply a motor drive signal to the motor drive circuit 102.

In FIG. 4, reference numeral 300a denotes a microcomputer configured to limit the driving of the motor. In the microcomputer 300a, the software configuration is shown with the functional blocks. In FIG. 4, the microcomputer 300a includes a sub-LAN signal processing unit 301, a sub-target current calculation unit 302a, a drive limit processing unit 303 and the abnormality determination unit 304.

The sub-LAN signal processing unit 301 supplies a control signal (e.g., a steering wheel angle detection value pos2 of the steering wheel angle sensor 9 and a vehicle speed signal vsp2) obtained via the on-board LAN 6 to the sub-target current calculation unit 302a.

The sub-target current calculation unit 302a decides a sub-target current value (Ti2) by making a predetermined arithmetical calculation, based on a motor position detected by the motor position sensor 11 and a control signal (e.g., a steering wheel angle pos2 detected by the steering wheel angle sensor 9 and a vehicle speed signal vsp2) from the on-board LAN 6, and supplies the decided Ti2 to the abnormality determination unit 304 and the drive limit processing unit 303.

The drive limit processing unit 303 generates a drive limit signal for inhibiting the driving of the motor 5a in an opposite direction to the sub-target current Ti2, and supplies it to the motor drive limiting circuit 104.

The abnormality determination unit 304 compares the target current Ti1 received from the main calculation unit with the target current Ti2. If the deviation between Ti1 and Ti2 is greater than or equal to a predetermined value, a motor drive cut-off signal for cutting off the driving of the motor is generated and supplied to the motor drive limiting circuit 104.

The motor drive circuit 102 drives the motor 5a to generate a torque for controlling the steering angle of the steering control wheel, based on a motor drive signal from the current control unit 203 and a motor drive limit signal from the motor drive limiting circuit 104.

As described above, the steering system according to this embodiment can inhibit the driving of the motor 5a in an opposite direction to the sub-target current value (Ti2) decided by the sub-target current calculation unit 302a, and prevent the steering of the steering control wheel in the opposite direction even at the abnormal time of the main target current (Ti1), such as when the control signal (e.g., a steering wheel angle detection value pos2 of the steering wheel angle sensor 9 or a vehicle speed signal vsp1) inputted via the main LAN signal processing unit 201 is abnormal.

Also, if the deviation between the main target current value (Ti1) and the sub-target current value (Ti2) is greater than or equal to a predetermined value, the driving of the motor 5a is cut off, whereby it is possible to securely prevent the steering based on an abnormal control signal, when the control signal (e.g., a steering wheel angle detection value pos1 of the steering wheel angle sensor 9 or a vehicle speed signal vsp1) inputted via the main LAN signal processing unit 201 is abnormal.

Embodiment 3

An embodiment 3 of the invention will be described below with reference to the drawings. A steering control system according to the embodiment 3 of the invention has the same configuration as the steering control system as described in the embodiment 1, and is not described in detail.

FIG. 5 is a functional block diagram showing functionally the steering control system according to the embodiment 3.

The steering control system according to the embodiment 3 includes the on-board LAN signal transceivers 101a and 101b, a motor drive circuit 102 for driving the motor 5, a current detection circuit 103 for detecting a current flowing through the motor 5, a motor drive limiting circuit (motor drive limiting unit) 104 for limiting the driving of the motor 5, a microcontroller 200b that serves as a main calculation unit, and a microcontroller 300b that serves as a sub calculation unit.

In FIG. 5, reference numeral 200b denotes a microcomputer that performs the steering assist control. In the microcomputer 200b, the software configuration is shown with the functional blocks. In FIG. 5, the microcomputer 200b includes a main LAN signal processing unit 201, a main target current calculation unit 202, a current control unit 203, a main LAN signal abnormality determination unit 205, and a final target current calculation unit 206.

The main LAN signal processing unit 201 supplies a vehicle speed signal (vsp1) obtained via the on-board LAN 6 to the main target current calculation unit 202, and similarly supplies a control signal (e.g., a current directing signal Add_i1 generated by another control system) to the main LAN signal abnormality determination unit 205, the final target current calculation unit 206, and a sub-LAN signal abnormality determination unit 305 as will be described later.

The main target current calculation unit 202 decides a main target current value (Ti1) for driving the motor 5 by making a predetermined arithmetical calculation, based on a torque detection signal Ts1 of the torque sensor 3 for detecting the steering wheel torque and a control signal (e.g., a vehicle speed signal vsp1) from an on-board LAN 6, and supplies the decided Ti1 to the final target current calculation unit 206.

The main LAN signal abnormality determination unit 205 determines the abnormality of the LAN signal, that is, the abnormality of the on-board LAN 6, by comparing the current directing signal Add_i1 with the current directing signal Add_i2 received from the sub calculation unit, as will be described later, and supplies a LAN signal abnormality determination result to the final target current calculation unit 206.

Figure 6A:
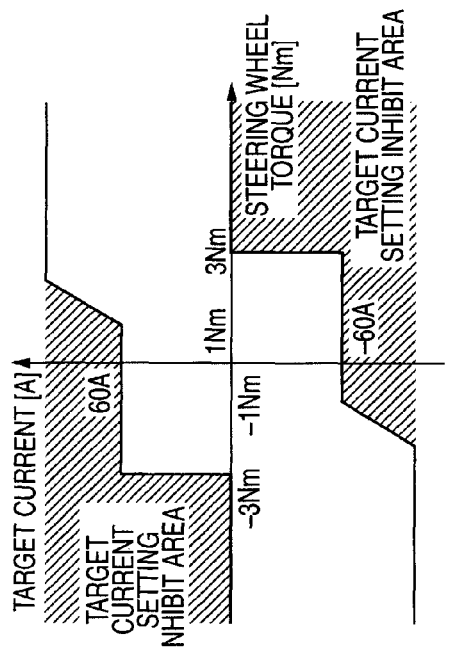
FIGS. 6A to 6D are characteristic views showing the limited area in the steering control system according to the embodiment 3 of the invention.
Figure 6C:
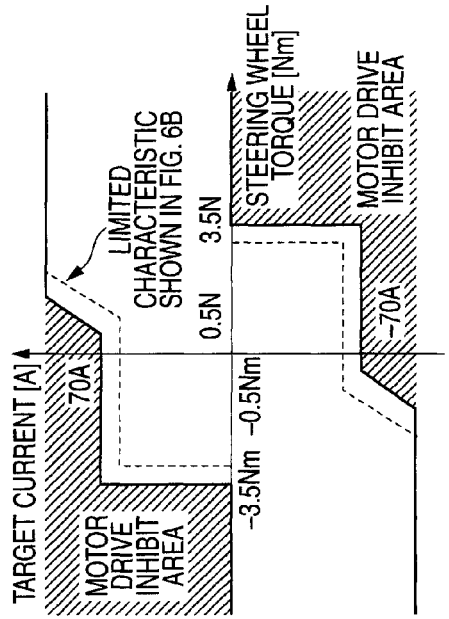
Figure 6B:
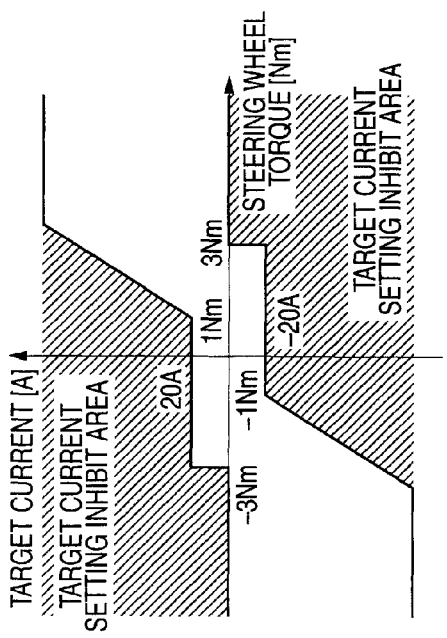

When the abnormality determination result of the main LAN signal abnormality determination unit 205 is "normal," the final target current calculation unit 206 decides the target current Ti by the following processes: adding the main target current value Ti1 and the current directing signal Add_i1; and limiting the added current value to an area of FIG. 6B, based on the torque detection signal Ts1 of the torque sensor 3. On the other hand, when the abnormality determination result of the main LAN signal abnormality determination unit 205 is "abnormal," the final target current calculation unit 206 decides the target current Ti by the following process: without adding the current directing signal Add_i1, limiting the main target current value Ti1 to an area of FIG. 6A, based on the torque detection signal Ts1 of the torque sensor 3. Thereafter, the final target current calculation unit 206 supplies Ti decided in this manner to the current control unit 203 and a drive limit processing unit 303b described later.

The current control unit 203 performs the feedback control for matching a detection current (Mi) detected by the current detection circuit 103 with the target current (Ti) to supply a motor drive signal to the motor drive circuit 102.

In FIG. 5, reference numeral 300b denotes a microcomputer that limits the driving of the motor. In the microcomputer 300b, the software configuration is shown with the functional blocks. In FIG. 5, the microcomputer 300b includes a sub-LAN signal processing unit 301, a sub-LAN signal abnormality determination unit 305, and a drive limit processing unit 303b.

The sub-LAN signal processing unit 301 supplies a control signal (e.g., a current directing signal Add_i2 generated by another control system) obtained via the on-board LAN 6 to the main LAN signal abnormality determination unit 205 and the sub-LAN signal abnormality determination unit 305.

The sub-LAN signal abnormality determination unit 305 determines the abnormality of the LAN signal, that is, the abnormality of the on-board LAN 6, by comparing the current directing signal Add_i2 with the current directing signal Add_i1 received from the main calculation unit, and supplies a LAN signal abnormality determination result to the drive limit processing unit 303b.

The drive limit processing unit 303b compares the target current Ti received from the main calculation unit with a motor drive inhibit area of FIG. 6C judged based on the steering wheel torque Ts2 detected by the torque sensor 3, if the abnormality determination result of the sub-LAN signal abnormality determination unit 305 is "abnormal" or the current directing signal Add_i2 is 0. Then, if the target current Ti is the value within the motor drive inhibit area, a drive limit signal for limiting the driving of the motor 5 is generated and supplied to the motor drive limiting circuit 104.

Figure 6D:
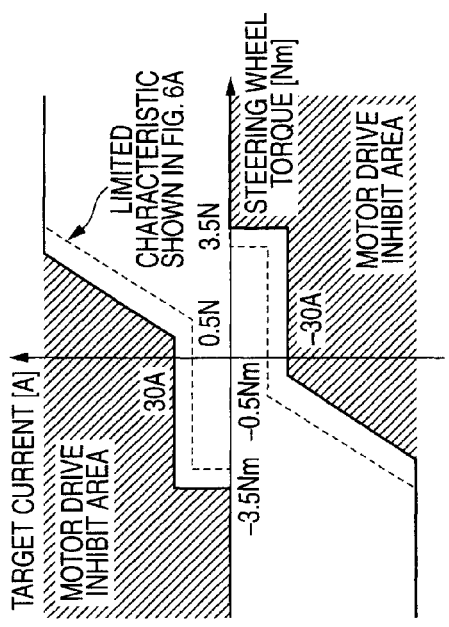

On the other hand, the drive limit processing unit 303b compares the target current Ti received from the main calculation unit with a motor drive inhibit area of FIG. 6D judged based on the steering wheel torque Ts2 detected by the torque sensor 3, if the abnormality determination result of the sub-LAN signal abnormality determination unit 305 is "normal" and the current directing signal Add_i2 is not 0. Then, if the target current Ti is the value within the motor drive inhibit area, a drive limit signal for limiting the driving of the motor 5 is generated and supplied to the motor drive limiting circuit 104.

The motor drive circuit 102 drives the motor 5 to generate a steering assist torque, based on a motor drive signal from the current control unit 203 and a motor drive limit signal from the motor drive limiting circuit 104.

As described above, the steering system according to this embodiment controls the motor 5, based on a current directing signal from another control system obtained via the on-board LAN 6, but if the determination result of the main LAN signal abnormality determination unit 205 is "abnormal", it controls the motor without using the control signal from the on-board LAN 6, whereby it is possible to prevent the abnormal assist even at the abnormal time of the LAN signal.

Also, since the driving of the motor 5 can be limited by setting the wider motor drive inhibit area based on the steering wheel torque detected by the torque sensor 3 at the abnormal time of the LAN signal based on the determination result of the sub-LAN signal abnormality determination unit 305, it is possible to prevent the abnormal assist even when the LAN signal is abnormal.

Though in the embodiments 1 to 3, the main calculation unit and the sub calculation unit have the dedicated on-board LAN transceivers 101a and 101b, they may have one common on-board LAN transceiver to achieve the same effect. In this case, since one on-board LAN transceiver is required, there is the effect that the configuration is simplified, and the cost is reduced.

In the embodiments 1 to 3, the same signals, such as the torque detection signals Ts1 and Ts2 or the vehicle speed signals vsp1 and vsp2, are distinguished with the suffix 1 and 2 to indicate the inputs into the main calculation unit or sub calculation unit, and the calculation results, in which the same value or sign is attained in the normal state, but the value or sign may be deviated because of some failure.

The on-board LAN 6 can operate in accordance with a specific communication protocol, such as CAN (Controller Area Network) or FlexRay. Also, though both the main calculation unit and the sub calculation unit make the abnormality determination for the on-board LAN 6 in the embodiment 3, any one of them may make the determination.

Further, though in the embodiments 1 to 3, the driving of the motor in the predetermined direction is inhibited or the motor is cut off to limit the driving of the motor, the driving itself may not be inhibited but the limit value may be provided for the output of torque, rotation angle or rotation rate, or the calculation content of the main calculation unit or the sub calculation unit may be changed to limit the output of the torque, rotation angle or rotation rate within the predetermined range without departing from the technical idea of the invention.

Furthermore, though in the embodiment 1, the driving of the motor by the main calculation unit is inhibited in the opposite direction to the motor drive direction computed by the sub calculation unit, the driving of the motor by the main calculation unit may be permitted in the opposite direction to the motor drive direction computed by the sub calculation unit in an area where the steering wheel torque inputted into the sub calculation unit is small and the sub-target current value computed by the sub calculation unit is small, for example. Also, the area where the driving in the opposite direction is permitted may be changed based on information obtained from the on-board LAN.

What is claimed is:

1. A steering control system that is connectable to a motor configured to control a steering and a LAN (Local Area Network) and is allowed to receive a control signal for controlling the motor from the LAN is received, said steering control system comprising:
    a main calculation unit that is directly connectable to the LAN via a LAN transceiver;
    a motor drive circuit that is directly connected to the main calculation unit and configured to drive the motor;
    a sub calculation unit that is directly connectable to the LAN via a LAN transceiver; and
    a motor drive limiting unit that is directly connected to the sub calculation unit and the motor drive circuit, wherein the motor drive limiting unit is configured to limit a drive of the motor.

2. The steering control system according to claim 1, wherein the sub calculation unit is configured to operate the motor drive limiting unit to limit the driving of the motor, based on at least information obtained from the LAN.

3. The steering control system according to claim 1, wherein the main calculation unit and the sub calculation unit are connected via one common LAN transceiver to the LAN.

4. The steering control system according to claim 1, wherein the main calculation unit and the sub calculation unit are configured to directly communicate to each other, and
    wherein the sub calculation unit is configured to operate the motor drive limiting unit to limit the driving of the motor, based on a comparison result between a value based on at least information obtained from the LAN and a value sent from the main calculation unit.

5. The steering control system according to claim 1, wherein the main calculation unit and the sub calculation unit are configured to directly communicate to each other, and
    wherein the main calculation unit is configured to compute a control amount of the motor, based on at least information obtained from the LAN,
    wherein the sub calculation unit is configured to compute a control amount of the motor, based on at least information obtained from the LAN, and
    wherein the sub calculation unit is configured to operate the motor drive limiting unit to limit the driving of the motor, if the deviation between the control amount sent from the main calculation unit and the control amount computed by the sub calculation unit is greater than or equal to a predetermined value.

6. The steering control system according to claim 1, wherein the sub calculation unit is configured to compute a drive direction of the motor, based on at least information obtained from the LAN, and to operate the motor drive limiting unit to inhibit the drive of the motor in an opposite direction to the computation result.

7. The steering control system according to claim 1, wherein the main calculation unit and the sub calculation unit are configured to directly communicate to each other, and
wherein at least one of the main calculation unit and the sub calculation unit is configured to determine an abnormality of the LAN, based on a comparison result between a value received from the LAN by own calculation unit and a value received from the LAN and sent by other calculation unit.

8. The steering control system according to claim 1, wherein the main calculation unit and the sub calculation unit are configured to directly communicate to each other, and
wherein each of the main calculation unit and the sub calculation unit is configured to determine the abnormality of the LAN, based on the comparison result between the value received from the LAN by own calculation unit and the value received from the LAN and sent by other calculation unit.

9. The steering control system according to claim 7, wherein the main calculation unit is configured to control the motor without using information obtained from the LAN, if it is determined that the LAN is abnormal.

10. The steering control system according to claim 7, wherein the sub calculation unit is configured to operate the motor drive limiting unit to limit the drive of the motor without using information obtained from the LAN, if it is determined that the LAN is abnormal.

11. The steering control system according to claim 1, further comprising a torque detection unit configured to detect a steering effort of the driver,
wherein the main calculation unit and the sub calculation unit are configured to compute the control amount of the motor, based on an output of the torque detection unit and information obtained from the LAN.

12. The steering control system according to claim 11, wherein the sub calculation unit is configured to:
compute at least the drive direction of the motor, based on information obtained from the torque detection unit and the LAN signal; and
operate the motor drive limiting unit to limit the driving of the motor in an opposite direction to the computation result.

13. The steering control system according to claim 12, wherein the sub calculation unit is configured to change a drive limited area of the motor, based on information obtained from the LAN signal.

14. The steering control system according to claim 1, further comprising a steering wheel angle detection unit configured to detect a steering wheel angle of the driver,
wherein the main calculation unit and the sub calculation unit are configured to compute a control amount of the motor, based on an output of the steering wheel angle detection unit and information obtained from the LAN.

15. The steering control system according to claim 1, further comprising a motor position detection unit configured to detect the motor position,
wherein the main calculation unit and the sub calculation unit are configured to compute a control amount of the motor, based on an output of the motor position detection unit and information obtained from the LAN.

* * * * *